(12) United States Patent  (10) Patent No.: US 9,147,328 B2
Ioffreda et al.  (45) Date of Patent: Sep. 29, 2015

(54) CREATING TACTILE CONTENT WITH SOUND

(71) Applicant: Disney Enterprises, Inc., Burbank, CA (US)

(72) Inventors: Chris Ioffreda, Arlington, VA (US); Ali Israr, Monroeville, PA (US); Ivan Poupyrev, Pittsburgh, PA (US); Michael Holton, Manhattan Beach, CA (US)

(73) Assignee: Disney Enterprises, Inc., Burbank, CA (US)

( * ) Notice: Subject to any disclaimer, the term of this patent is extended or adjusted under 35 U.S.C. 154(b) by 88 days.

(21) Appl. No.: 14/070,852

(22) Filed: Nov. 4, 2013

(65) Prior Publication Data

US 2015/0123774 A1 May 7, 2015

(51) Int. Cl.
*H04B 3/36* (2006.01)
*G08B 6/00* (2006.01)
*G06F 3/16* (2006.01)
*H04R 3/00* (2006.01)
*H04R 9/06* (2006.01)

(52) U.S. Cl.
CPC *G08B 6/00* (2013.01); *G06F 3/165* (2013.01); *H04R 3/00* (2013.01); *H04R 9/063* (2013.01); *H04R 2400/03* (2013.01); *H04R 2430/03* (2013.01)

(58) Field of Classification Search
CPC .................................. G06F 3/016; G08B 6/00
USPC ............. 340/407.1, 407.2; 345/156, 163, 173
See application file for complete search history.

(56) References Cited

U.S. PATENT DOCUMENTS

| 8,754,757 | B1* | 6/2014 | Ullrich et al. | 340/407.1 |
| 2006/0038781 | A1* | 2/2006 | Levin | 345/163 |
| 2012/0306631 | A1* | 12/2012 | Hughes | 340/407.1 |
| 2014/0292501 | A1* | 10/2014 | Lim et al. | 340/407.2 |

* cited by examiner

*Primary Examiner* — Tai T Nguyen
(74) *Attorney, Agent, or Firm* — Farjami & Farjami LLP

(57) ABSTRACT

There is provided a system and method for creating tactile content by using an audio stream. The method includes capturing an audio stream using a microphone, processing the audio stream to generate an audio data stream, executing a haptic algorithm using the audio data stream to generate an activation pattern for a plurality of actuators, and activating the plurality of actuators according to the activation pattern. The activation pattern is generated from the audio data stream based on both a frequency of the audio stream and triggering sounds in the audio stream. The plurality of actuators include both voice coils and vibrating motors.

14 Claims, 9 Drawing Sheets

CREATING TACTILE CONTENT WITH SOUND

BACKGROUND

Entertainment technologies deliver rich multi-dimensional, high-resolution, and highly immersive visual and audio experiences to a user. Augmenting these entertainment technologies with high-resolution haptic feedback devices significantly enhances the experience of the user leading to a deeper sense of immersion and believability. However, current haptic feedback devices are only able to capture audio streams and vibrate all actuators arranged in a pre-defined configuration similarly. As such, current haptic feedback systems are not able to process the captured audio streams in order to create haptic feedback patterns for the actuators that give the user a deeper sense of immersion and believability. This leaves the current haptic feedback devices homogenous, static, and dull.

SUMMARY

The present disclosure is directed to a haptic feedback system that utilizes a haptic algorithm to create tactile content with sound, substantially as shown in and/or described in connection with at least one of the figures, as set forth more completely in the claims.

DETAILED DESCRIPTION

Figure 1:
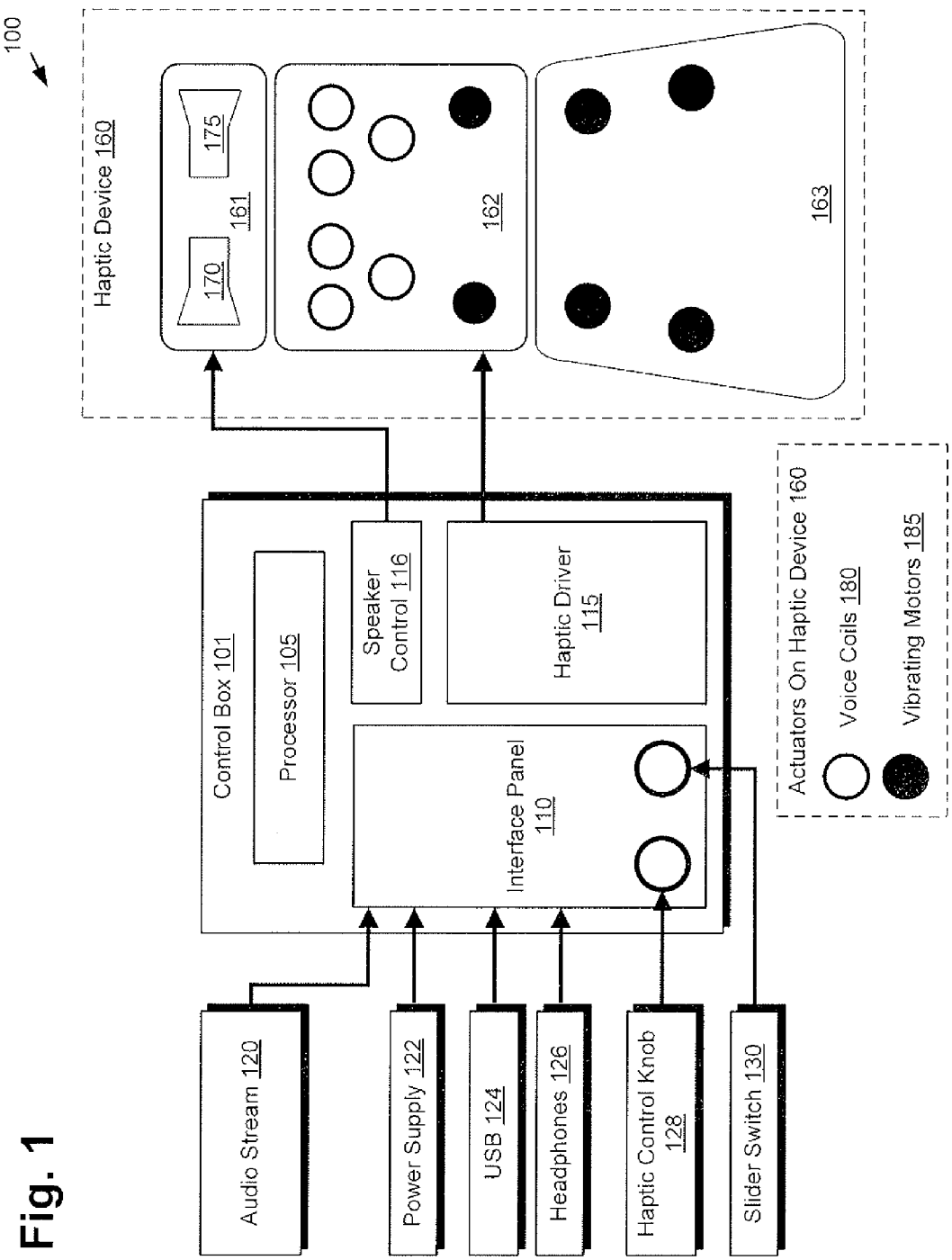
FIG. 1 presents a system for creating tactile content for a haptic device by utilizing an audio stream, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system for creating tactile content for a haptic device by utilizing an audio stream, according to one implementation of the present disclosure. System 100 of FIG. 1 includes control box 101, audio stream 120, power supply 122, universal serial bus (USB) 124, headphones 126, haptic control knob 128, slider switch 130, and haptic device 160. Control box 101 includes processor 105, interface panel 110, haptic driver 115, and speaker control 116. Haptic device 160 includes head pad 161, back pad 162, and seat pad 163. Head pad 161 includes right speaker 170 and left speaker 175. Back pad 162 includes voice coils 180 and vibrating motors 185. Seat pad 163 also includes vibrating motors 185.

It is noted that haptic device 160 is represented as a chair in the implementation of FIG. 1. However, the present disclosure is not limited to haptic device 160 only including a chair. In other implementations, haptic device 160 can include any device for which actuators can be installed. For example, haptic device 160 may include, but is not limited to, clothing, other types of furniture, a mat for the floor, a controller, a seat built into a ride, or a blanket.

It is further noted that control box 101 is illustrated as being separate from haptic device 160 in FIG. 1. In such an implementation, control box 101 may be externally attached to haptic device 160 through a physical or wireless connection. In other implementations, control box 101 may be built directly into haptic device 160. For example, control box 101 may be built directly into seat pad 163, such as in the front right portion of seat pad 163. This way a user of haptic device 160 can easily access control box 101 while still using haptic device 160.

Haptic device 160 includes right speaker 170, left speaker 175, voice coils 180, and vibrating motors 185. Voice coils 180 and vibrating motors 185 are also collectively referred to as actuators. As illustrated in the implementation of FIG. 1, head pad 161 includes right speaker 170 and left speaker 175, back pad 162 includes six voice coils 180 and two vibrating motors 180, and seat pad 163 includes four vibrating motors 180. However, it is noted that the implementation of FIG. 1 is not limiting to this configuration for right speaker 170, left speaker 175, voice coils 180, and vibrating motors 185. In other implementations, head pad 161, back pad 162, and seat pad 163 may include any number of speakers, voice coils 180, and vibrating motors 185. For example, head pad 161, back pad 162, and seat pad 163 may each include two voice coils 180 and two vibrating motors 185. Still in other implementations, haptic device 160 may include only one of voice coils 180 or vibrating motors 185.

As illustrated in FIG. 1, each of right speaker 170, left speaker 175, voice coils 180, and vibrating motors 185 are built into haptic device 160. However, in other implementations, one of right speaker 170, left speaker 175, voice coils 180, and vibrating motors 185 may be removable from haptic device 160. In such an implementation, a user of haptic device 160 is able to move and arrange the speakers and actuators of haptic device 160 into a user preferred arrangement.

Voice coils 180 and vibrating motors 185 are two types of actuators that are used in haptic device 160, however, other types of actuators may also be used. Voice coils 180 include voice coil motors that produce a high-frequency vibration sensation when activated. Vibrating motors 185 include direct current (DC) motors that produce a rumble-like sensation when activated. By using two types of actuators in haptic device 160, such as voice coils 180 and vibrating motors 185, haptic device 160 is able to produce customized types of sensations on the user. Furthermore, the actuators can be programmed with various vibrating patterns that are activated by audio stream 120 to give the user a more realistic experience, as explained in more detail below with regards to FIG. 2.

Also illustrated in FIG. 1 is control box 101. Control box 101 includes processor 105, interface panel 110, and haptic driver 115. Control box 101 will be explained in greater detail below with regards to FIG. 2.

Also illustrated in FIG. 1 are audio stream 120, power supply 122, USB 124, and headphones 126. Audio stream 120 may include any noise that is capable of being captured by control box 101. For example, audio stream 120 may include music or action sounds from a video game being played by a user of haptic device 160. For another example, audio stream 120 may include music or a narrative from a television show or a movie being watched by a user of haptic device 160.

Power supply 122 is the power source that is used to activate control box 101 of haptic device 160. Power supply 122 might include a power cord that plugs into a power outlet, or power supply 122 might consist of batteries. USB 124 includes a universal serial bus that can be plugged into interface panel 110. USB 124 is then able to update a haptic algorithm of haptic device 160 or upload predefined patterns into haptic device 160, as described in more detail below in FIG. 2. Headphones 126 may include any type of headphones used by a user of haptic device 160 that can be plugged into control box 101 using interface panel 110.

In the implementation of FIG. 1, control box 101 captures audio stream 120, such as through a microphone installed in control box 101. Control box 101 then processes audio stream 120 and executes a haptic algorithm to generate an activation pattern for the actuators of haptic device 160, such as for voice coils 180 and vibrating motors 185. Control box 101 then uses haptic driver 115 to activate the actuators of haptic device 160 according to the generated activation pattern. Control box 101 may also use speaker control 116 to play music or action sounds out of right speaker 170 and left speaker 175 of haptic device 160. This process of using audio stream 120 to activate actuators of haptic device 160 is described in greater detail below with regards to FIG. 2.

Figure 2:
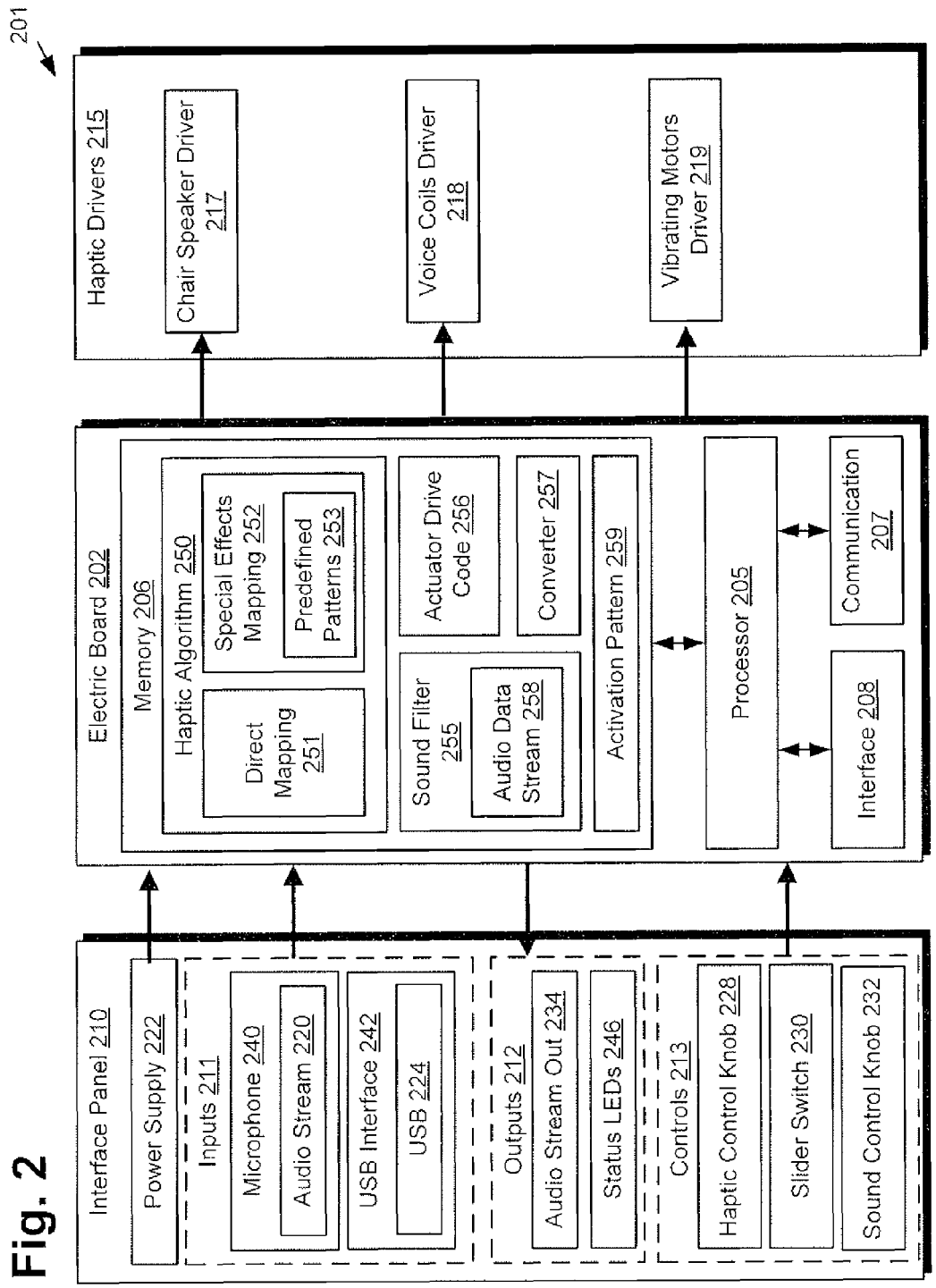
FIG. 2 presents a control box for a haptic device, according to one implementation of the present disclosure.

FIG. 2 presents a control box for a haptic device, according to one implementation of the present disclosure. Control box 201 of FIG. 2 includes electronic board 202, interface panel 210, and haptic driver 215. Electronic board 202 includes processor 205, memory 206, communication 207, and interface 208. Memory 206 includes haptic algorithm 250, sound filter 255, actuator drive code 256, converter 257, and activation pattern 259. Haptic algorithm 250 includes direct mapping 251 and special effects mapping 252, which includes predefined patterns 253. Sound filter 255 includes audio data stream 258. Interface panel 210 includes inputs 211, outputs 212, controls 213, and power supply 222. Inputs 211 includes audio stream out 234 and USB interface 242. USB interface 242 includes USB 224. Outputs 212 includes headphones 226 and status light-emitting diodes (LEDs) 246. Controls 213 includes haptic control knob 228, slider switch 230, and sound control knob 232. Microphone 240 includes audio stream 220. Haptic driver 215 includes chair speaker driver 217, voice coil driver 218, and vibrating motor driver 219.

With regards to FIG. 2, it should be noted that control box 201, processor 205, interface panel 210, haptic driver 215, audio stream 220, power supply 222, USB 224, haptic control knob 228, and slider switch 230, correspond respectively to control box 101, processor 105, interface panel 110, haptic driver 115, audio stream 120, power supply 122, USB 124, haptic control knob 128, and slider switch 130 of FIG. 1. Furthermore, haptic device 160 from FIG. 1 has been removed from FIG. 2 for clarity purposes.

Electronic board 202 of control box 201 includes processor 205 and memory 206. Processor 205 may be configured to access memory 206 to store received input or to execute commands, processes, or programs stored in memory 206, such as haptic algorithm 250. Processor 205 may correspond to a processing device, such as a microprocessor or similar hardware processing device, or a plurality of hardware devices. However, in other implementations processor 205 refers to a general processor capable of performing the functions required of control box 201. Memory 206 is a sufficient memory capable of storing commands, processes, and programs for execution by processor 205. Memory 206 may be instituted as ROM, RAM, flash memory, or any sufficient memory capable of storing a set of commands. In other implementations, memory 206 may correspond to a plurality memory types or modules. Memory 206 may also be protected to prevent outside manipulation of memory 206 or specific portions of memory 206.

As illustrated in FIG. 2, memory 206 includes haptic algorithm 250. Haptic algorithm 250 utilizes audio data stream 258, which has been processed from audio stream 220, and maps activation pattern 259 for the actuators of a haptic device, such as voice coils 180 and vibrating motors 185 of haptic device 160 from FIG. 1. For example, audio stream data 258 may be divided into different frequency band energy levels using sound filter 255. Haptic algorithm 250 then uses the different frequency band energy levels of audio stream data 258 to map activation pattern 259 for the actuators of the haptic device. For another example, haptic algorithm 250 may alternatively utilize audio stream data 258 to search for a particular triggering sound from audio stream 220. Haptic algorithm 250 may then activate a predefined pattern from predefined patterns 253 for the actuators when the particular triggering sound is recognized, as described in more detail below.

In order to map activation patters for actuators of a haptic device, haptic algorithm 250 includes both direct mapping 251 and special effects mapping 252. Direct mapping 251 generates activation patterns for the actuators according to the different frequency band energy levels of audio stream data 258. For example, a high frequency band energy may cause the voice coils in the back pad to activate, while a medium frequency band energy may cause the vibrating motors in the back pad to activate. Furthermore, a low frequency band energy may cause the vibrating motors in the seat pad to activate. Direct mapping 251 will be described in more detail below in regards to FIG. 3.

Special effects mapping 252 generates activation patterns based on predefined patterns. As illustrated in FIG. 2, special effects mapping 252 includes predefined patters 253. Predefined patterns 253 includes predefined tactile activation patterns that have previously been loaded and stored in memory 206. The predefined tactile activation patterns of predefined patterns 253 are then activated when a triggering sound is received by control box 201, or by triggers from USB 224 inserted in USB interface 242. For example, predefined patterns 253 may include an activation pattern that triggers the actuators in the back pad to pulsate three times each time audio stream 220 includes the sound of a gun shot. As such, if audio stream 220 includes the sound of a gun shot, predefined patterns 253 will select the activation pattern that includes pulsating the actuators in the back pad three times.

Besides just utilizing action sounds as the triggering sounds of special effects mapping 252, frequency band energy levels may also activate a predefined pattern from predefined patterns 253. For example, one predefined pattern may be programmed to vibrate the actuators in a circular pattern each time a high frequency band energy is detected to play for five straight seconds. If audio data stream 258 then includes a high frequency band energy that plays for five seconds, the predefined pattern would activate causing the actuators to vibrate in a circular pattern.

It is noted that predefined patterns 253 is not just limited to activation patterns that pulsate the actuators and vibrating the actuators in a circular pattern, as discussed above. Activation patters for predefined patters 253 can include activating the actuators to follow any number of predefined patterns, such as, but not limited to, circular patterns, straight line patterns, expanding lines patterns, and moving up and down patterns. Furthermore, activation patterns of predefined patterns 253 can also include activating the actuators with various levels of intensity. For example, some triggering sounds may cause the actuators to vibrate with a higher strength while other triggering sounds may cause the actuators to vibrate with a lower strength.

Also illustrated in FIG. 2, interface panel 210 includes inputs 211, outputs 212, and controls 213. Inputs 211 includes both audio stream 220 received by microphone 240, and USB 224 received by USB interface 242. As described above with regards to FIG. 1, audio stream 220 may include any noise capable to being captured by a haptic device, such as music or action noises from a video game or movie. For example, a user of the haptic device may be playing an action packed football video game that involves hard tackling. Audio stream 220 may then include background music, a narrative by the announcers, a whistle blown by a referee, or action noises of the hard tackle that is played out from the video game.

USB interface 242 includes an interface for a USB, such as USB 224. USB interface 242 may be used to both receive updates to the haptic device and to generate activation patterns for the actuators. For example, a user of the haptic device may plug USB 224 into USB interface 242 to update predefined patterns 253 with new patterns. These new patterns may be available for the haptic device each time a new video game or movie is released, thus, giving the user of the haptic device a more personalized experience with the newly released video game or movie. For a second example, a user may plug USB 224 into USB interface 242 to update haptic algorithm 250 so that audio stream 220 will generate different activation patterns 259. For a third example, a user may plug USB 224 into USB interface 242 to directly activate a predefined pattern from predefined patterns 253.

Outputs 212 includes audio stream out 234 and status LEDs 246. Audio stream out 234 may include music or action sounds output by control box 201. For example, audio stream out 234 may correspond to audio stream 220, except that audio stream out 234 is being output by the haptic device. Furthermore, audio stream out 234 may be output using electronic device capable of interfacing with interface panel 210. For example, audio stream out 234 may be output using headphones 126 from FIG. 1. Status LEDs 246 may include a single LED or a series of LEDs that light up when the haptic device is turned on. Status LEDs 246 are thus utilized to notify the user if the haptic device is on or off.

Controls 213 include haptic control knob 228, slider switch 230, and sound control knob 232. Haptic control knob 228 controls a perceived strength of the actuators, such as voice coils 180 and vibrating motors 185 from FIG. 1. For example, a linear range for haptic control knob 228 may include (0 to 1), which is scaled by a function that uniformly increases the perceived strength of haptic feedback for the actuators. A user of the haptic device may then increase the perceived strength of the actuators by turning haptic control knob 228 to an increased value, or close to one. The actuators of the haptic device would then vibrate at a higher strength, thus, increasing the strength of the vibration on the user. Furthermore, a user of the haptic device may also decrease the perceived strength of the actuators by turning haptic control knob 226 to a decreased value, or close to zero. The actuators of the haptic device would then vibrate at a lower strength, thus, decreasing the strength of the vibration on the user.

Slider switch 230 controls a mode of haptic algorithm 250. For example, in a movie mode, haptic algorithm 250 may activate all of the actuators in the haptic device with the same level of intensity while in a game mode, haptic algorithm 250 may cause the actuators in the seat pad be more dominating, thus, actuators in the seat pad may be activated at a higher intensity level then the actuators in the back pad. A user of the haptic device can then use slider switch 230 to change the mode of haptic algorithm 250 from the game mode to the movie mode when the user switches from playing a game to watching a movie. This gives the user the ability to customize how the actuators of the haptic device respond according to the type of entertainment the haptic device is being used for.

It is noted that the example above only discusses using slider switch 230 to change between a game mode and a movie mode, however, this example is not limiting. Slider switch 230 can also be used to change between other types of modes, such as, but not limited to, a music mode or a television mode. Furthermore, other modes might not be specific towards a type of entertainment. For example, modes might be specific towards frequency band energy levels. In such an example, a first mode might cause the actuators in the back pad of the haptic device to vibrate when a high frequency band energy is detected, while a second mode might cause the actuators in the back pad of the haptic device to vibrate when a low frequency band energy is detected.

Sound control knob 232 controls a sound level for both audio stream out 234 and the speakers built into the haptic device, such as right speaker 170 and left speaker 175 of haptic device 160 from FIG. 1. Sound control knob 232 can be used to both decrease the level of sound and increase the level of sound.

Also illustrated in FIG. 2 is haptic drivers 215. Haptic drivers 215 include chair speaker driver 217, voice coils driver 218, and vibrating motors driver 219. Chair speaker driver 217 is used to activate the speakers of the haptic device, such as right speaker 170 and left speaker 175 of haptic device 160 from FIG. 1. Chair speaker driver 217 may cause the speakers to play music, sound effects, or any other sound needed to enhance the experience of the user. Voice coils driver 218 activates the voice coils of the haptic device, such as voice coils 180 of haptic device 160 from FIG. 1. Vibrating motors driver 219 activates the vibrating motors of the haptic device, such as vibrating motors 185 of haptic device 160 from FIG. 1.

As illustrated in the implementation of FIG. 2, control box 201 captures audio stream 220 using microphone 240 of interface panel 210. Audio stream 220 is then sampled by converter 258, which may consist of an analog-to-digital converter. After audio stream 220 has been converted into digital audio by converter 258, the digital audio is processed into audio data stream 256 by dividing the digital audio into frequency band energy levels using sound filter 255 or a fast Fourier transform (FFT). Haptic algorithm 250 then utilizes audio data stream 256 to generate activation pattern 259. Haptic algorithm includes both direct mapping 251 and special effects mapping 252. Next, activation pattern 259 is utilized to activate haptic drivers 215.

Figure 3:
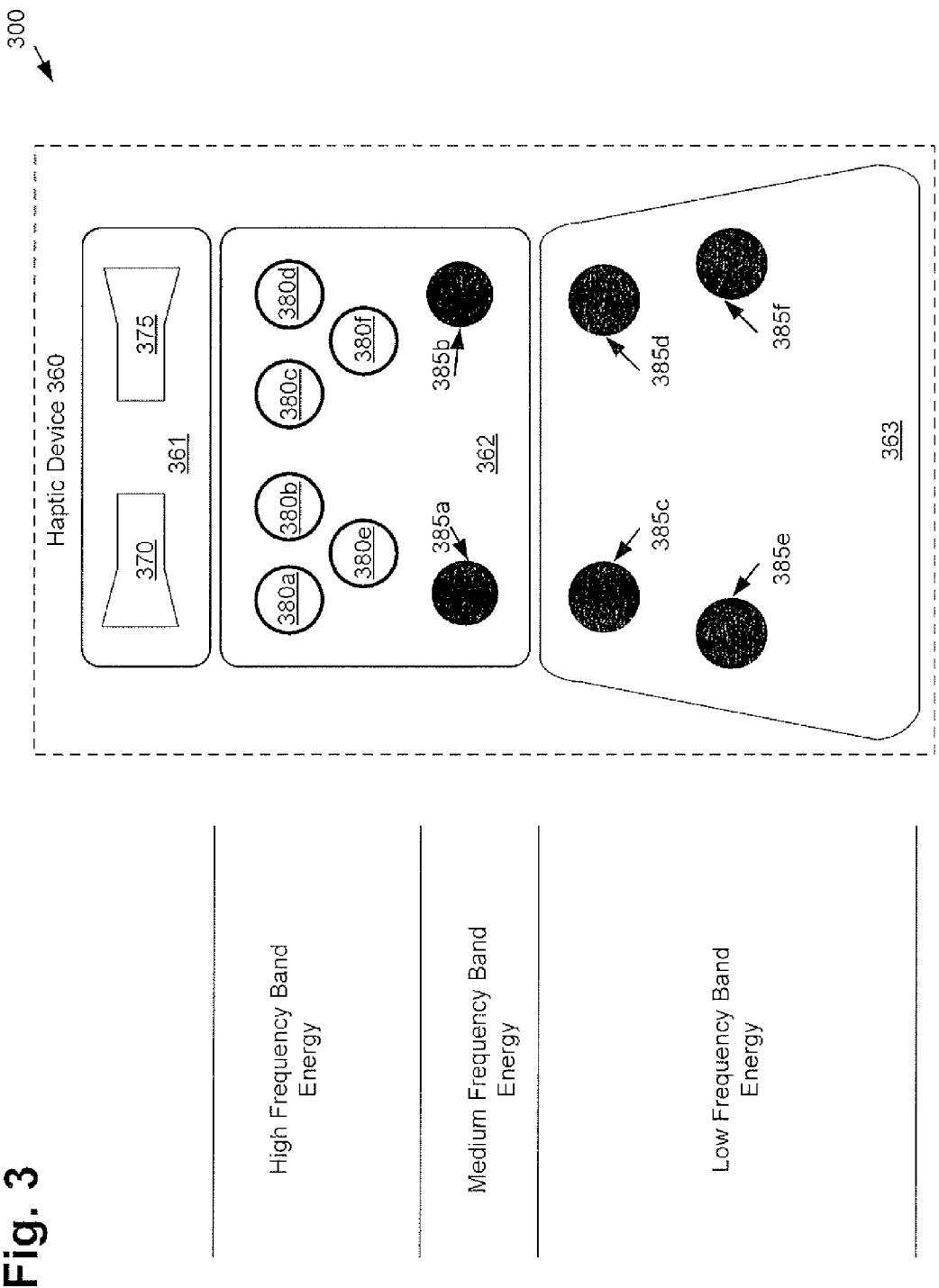
FIG. 3 presents an example of a direct mapping scheme for a haptic device, according to one implementation of the present disclosure.

FIG. 3 presents an example of a direct mapping scheme for a haptic device, according to one implementation of the present disclosure. Direct mapping 300 of FIG. 3 includes haptic device 360. Haptic device 360 includes head pad 361, back pad 362, and seat pad 363. Head pad 361 includes right speaker 370 and left speaker 375. Back pad 362 includes voice coils 380*a-f* and vibrating motors 385*a-b*. Seat pad 363 includes vibrating motors 385*c-f*. Also illustrated in FIG. 3 are high frequency band energy, medium frequency band energy, and low frequency band energy. It should be noted, that haptic device 360, head pad 361, back pad 362, seat pad 363, right speaker 370, left speaker 375, voice coils 380*a-f*, and vibrating motors 385*a-f* correspond respectively to haptic device 160, head pad 161, back bad 162, seat pad 163, right speaker 170, left speaker 175, voice coils 180, and vibrating motors 185 from FIG. 1.

As stated above, a captured audio stream is converted into digital audio. The digital audio is then processed by dividing the digital audio into different frequency band energy levels using filters or a FFT. The processed audio data stream can then be utilized by a haptic algorithm to generate an activation pattern according to a direct mapping scheme.

As illustrated in FIG. 3, the digital audio is processed into three different frequency band energy levels. The three frequency band energy levels include a high frequency band energy, a medium frequency band energy, and a low frequency band energy. The three different frequency band energy levels are then utilized to activate various actuators. For example, as illustrated in FIG. 3, a high frequency band energy activates voice coils 380*a-f* on back pad 362, a medium frequency band energy activates vibrating motors 385*a-b* on back pad 362, and a low frequency band energy activates vibrating motors 385*c-f* on seat pad 363.

It is noted that the implementation of FIG. 3 is only one example of a direct mapping scheme. In other implementations, the direct mapping scheme may include more or less frequency band energy levels. Furthermore, in other implementations, the frequency band levels may be mapped differently on haptic device 360. For example, a high frequency band energy may activate vibrating motors 385*c-f* on seat pad 363 while a low frequency band energy may activate voice coils 380*a-f* on back pad 362.

Figure 4:
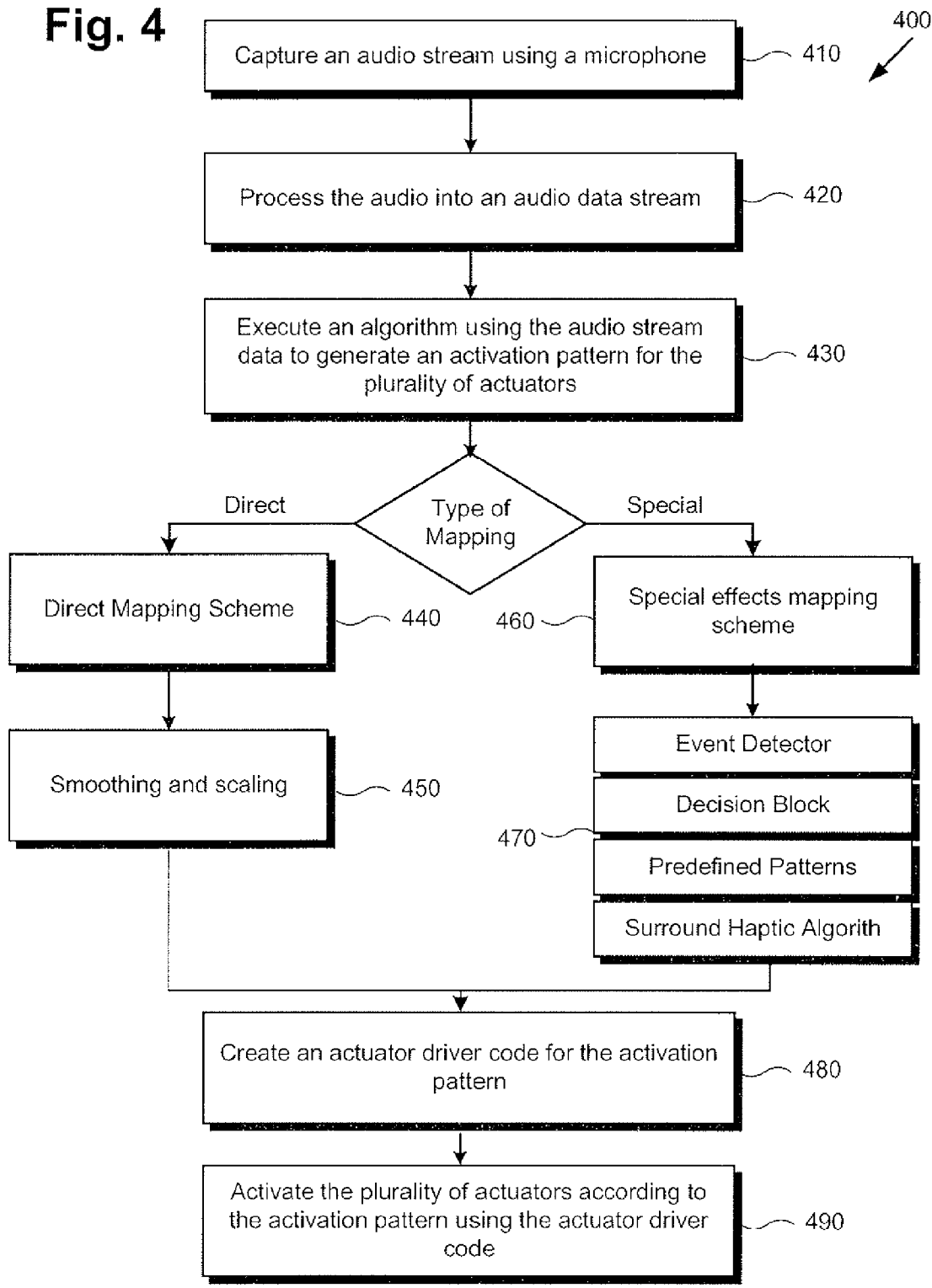
FIG. 4 shows a flowchart illustrating a method for creating tactile content by utilizing an audio stream, according to one implementation of the present disclosure.

FIG. 4 shows a flowchart illustrating a method for creating tactile content by utilizing an audio stream, according to one implementation of the present disclosure. The approach and technique indicated by flowchart 400 are sufficient to describe at least one implementation of the present disclosure, however, other implementations of the disclosure may utilize approaches and techniques different from those shown in flowchart 400. Furthermore, while flowchart 400 is described with respect to FIGS. 1, 2, and 3, the disclosed inventive concepts are not intended to be limited by specific features shown and described with respect to FIGS. 1, 2, and 3. Furthermore, with respect to the method illustrated in FIG. 4, it is noted that certain details and features have been left out of flowchart 400 in order not to obscure the discussion of inventive features in the present application.

Referring now to flowchart 400 of FIG. 4, flowchart 400 includes capturing an audio stream using a microphone (410). For example, processor 205 of control box 201 can activate microphone 240 to capture audio stream 220. As explained above, audio stream 220 can include any noise capable of being captured by microphone 240 of control box 201. While capturing audio stream 220, processor 205 may also utilize converter 258 to convert audio stream 220. For example, converter 258 may be an analog-to-digital converter that converts audio stream 220 into digital audio.

Flowchart 400 also includes processing the audio stream into an audio data stream (420). For example, processor 205 of control box 201 may process audio stream 220 into audio data stream 256. Audio stream 220 is processed into audio data stream 256 by dividing audio stream 220 into different frequency band energy levels using sound filter 255 or a FFT. The frequency band energy levels of audio data stream 256 may include, but are not limited to, a high frequency band energy, a medium frequency band energy, and a low frequency band energy.

Flowchart 400 also includes executing an algorithm using the audio data stream to generate an activation pattern for the plurality of actuators (430). For example, processor 205 of control box 201 may access haptic algorithm 250 stored in memory 206. Processor 205 may then execute haptic algorithm 250 using audio data stream 256 to generate activation pattern 259 for a plurality of actuators, such as voice coils 180 and vibrating motors 185 of FIG. 1. As will be discussed in more detail below in (440-470) of flowchart 400, haptic algorithm 250 may include two different mapping schemes for generating activation pattern 259, such as direct mapping 251 and special effects mapping 252.

If a direct mapping scheme is executed, then flowchart 400 includes generating an activation pattern according to a direct mapping scheme (440). For example, processor 205 of control box 201 may utilize the different frequency band energy levels of audio data stream 256 to generate activation pattern 259 according to direct mapping 251. As illustrated in FIG. 3, activation pattern 259 for direct mapping 251 may include activating voice coils 380*a-f* of back pad 362 for a high frequency band energy, activating vibrating motors 385*a-b* of back pad 362 for a medium frequency band energy, and activating vibrating motors 385*c-f* of seat pad 363 for a low frequency band energy. Furthermore, if a direct map scheme is activated, flowchart 400 includes smoothing and scaling of band energy (450). For example, processor 205 of control box 201 may smooth and scale the different frequency band energy levels using filters, so that the parameters of the actuators are optimized for a pleasurable range of vibrotactile perception.

If a special effects mapping scheme is executed, then flowchart 400 includes generating an activation pattern according to special effects mapping scheme (460). For example, processor 205 of control box 201 may utilize audio data stream 256 to generate activation pattern 259 according to predefined patterns 253 of special effects mapping 252. As discussed above, predefined patterns 253 includes predefined tactile activation patterns that have previously been loaded and stored in memory 206.

When special effects mapping 252 is activated, flowchart 400 further includes performing the steps of special effects mapping 252, which include an event detector, a decision block, selecting the predefined pattern, and the surround haptic algorithm (470). The event trigger detects triggers from both audio stream 220 and USB interface 242. For example, audio stream 220 may include a triggering sound, such as an action noise or a frequency pattern. After audio stream 220 is processed into audio data stream 256, processor 205 of control box 201 executes special effects mapping 252 to detect that triggering sound from audio data stream 256, which starts the generation of activation pattern 259.

Next, the decision block categorizes and selects a pattern to play. For example, processor 205 of control box 201 executes special effects mapping 252 to search through predefined patterns 253 for the predefined pattern that corresponds to the triggering sound from audio data stream 256. Next, the predefined pattern is selected. Finally, the surround haptic algorithm plays the pattern. For example, processor 205 of control box 201 executes special effects mapping 252 of haptic algorithm 250 to generate activation pattern 259. Activation pattern 259 corresponds to the selected predefined pattern from predefined patterns 252.

Flowchart 400 also includes creating an actuator driver code for the activation pattern (480). For example, processor 205 of control box 201 utilizes activation pattern 259 to create actuator driver code 256. Actuator driver code 256 sets the frequency, intensity, and location for activating the plurality of actuators according to activation pattern 259.

Flowchart 400 also includes activating the plurality of actuators according to the activation pattern using the actuator driver code (490). For example, processor 205 of control box 201 may activate the plurality of actuators, such as voice coils 180 and vibrating motors 185 from FIG. 1, using actuator driver code 256. Processor 205 can activate the plurality of actuators by utilizing voice coil driver 217 and vibrating motor driver 218 of haptic drivers 215. When activated, the plurality of actuators will follow activation pattern 259, thus giving the user a deeper sense of immersion and believability when using the haptic device.

Figure 5:
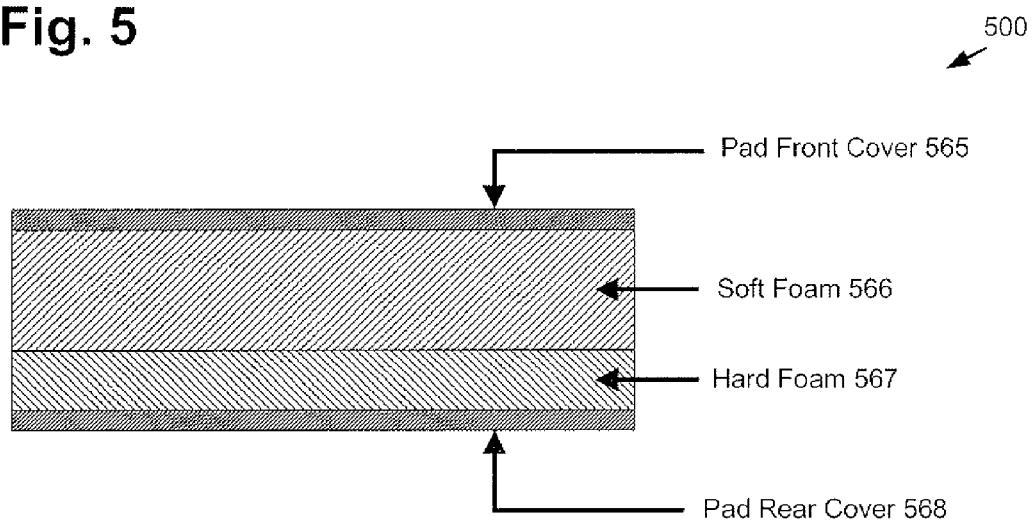
FIG. 5 presents a cross-section view of a pad that can be used for a haptic device, according to one implementation of the present disclosure.

FIG. 5 presents a cross-section view of a pad that can be used for a haptic device, according to one implementation of the present disclosure. As illustrated in FIG. 5, pad 500 includes pad front cover 565 situated over soft foam 566, soft foam 566 situated over hard foam 567, and hard foam 567 situated over pad rear cover 568. To attach the different layers of pad 500 together, an adhesive may be used, such as glue (not shown).

In a preferred implementation of the present disclosure, soft foam 566 is approximately 0.5 inch thick and hard foam 567 is approximately 0.25 inch thick. This is so that a user of the haptic device is comfortable while sitting on the haptic device. Furthermore, by having a layer of soft foam 566 that is approximately 0.5 inch thick, there is room for the placement of the actuators in the layer of soft foam 566. Hard foam 567 is then used to secure the actuators in place, as described in more detail in regards to FIG. 6.

Figure 6:
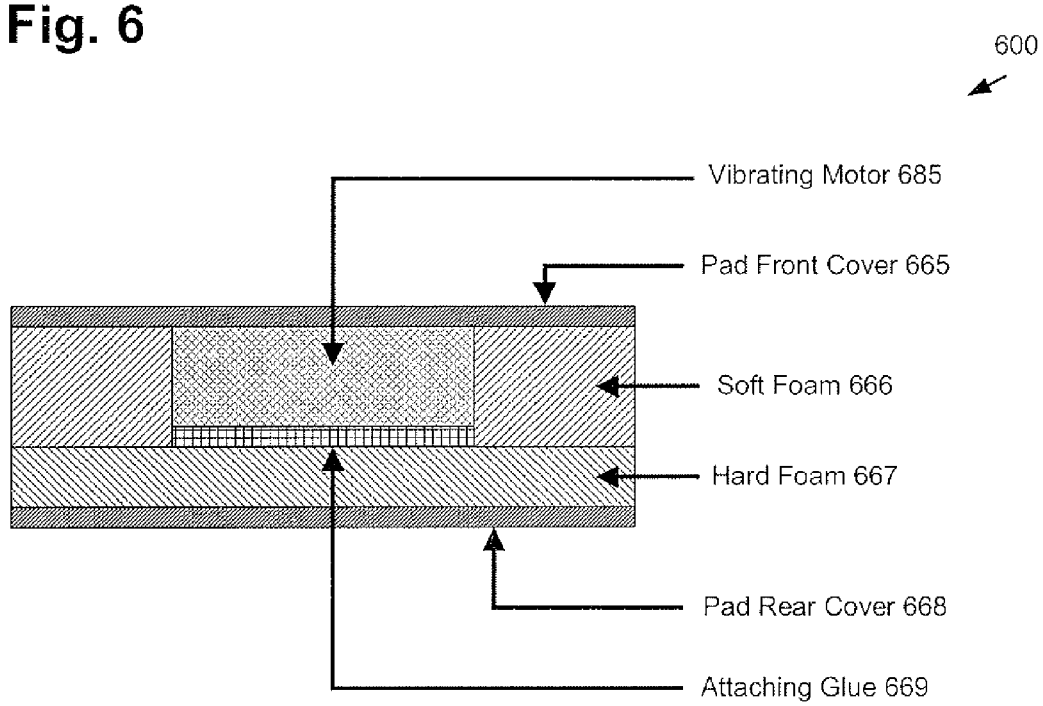
FIG. 6 presents a cross-section view of mounting a vibrating motor in a pad, according to one implementation of the present disclosure.

FIG. 6 presents a cross-section view of mounting a vibrating motor in a pad, according to one implementation of the present disclosure. With regards to FIG. 6, it should be noted that pad 600 corresponds to pad 500 from FIG. 5, except pad 600 now includes vibrating motor 685 inserted within pad 600. As such, pad front cover 665, soft foam 666, hard foam 667, and pad rear cover 668 of FIG. 6 correspond respectively to pad front cover 565, soft foam 566, hard foam 567, and pad rear cover 568 of FIG. 5. Furthermore, vibrating motor 685 corresponds to one of vibrating motors 185 of FIG. 1, and one of vibrating motors 385*a-f* of FIG. 3.

As illustrated in FIG. 6, vibrating motor 685 has now been inserted within pad 600. To insert vibrating motor 685, a section of soft foam 666 is removed from pad 600. Next, attaching glue 669 is situated over hard foam 667 in the removed area of soft foam 666. Vibrating motor 685 is then situated above attaching glue 669 within the removed section of soft foam 666. Finally, pad front cover 665 is situated over vibrating motor 685. By mounting vibrating motor 685 within pad 600 as illustrated in FIG. 6, vibrating motor 685 is secured in place by hard foam 667. Furthermore, the user of the haptic device will still be comfortable since soft foam 666 surrounds vibrating motor 685 and pad front cover 665 covers the top of vibrating motor 685.

Figure 7:
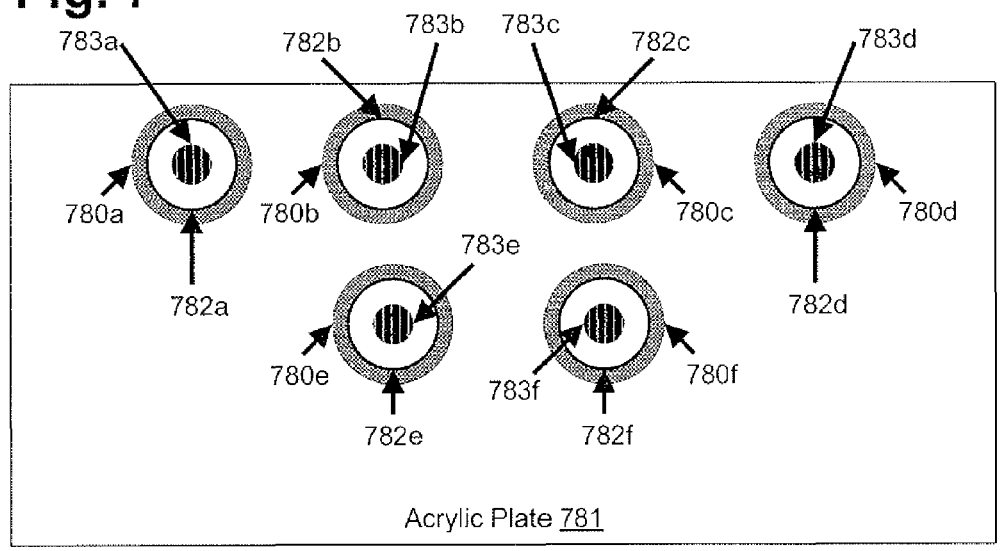
FIG. 7 presents a system of mounting voice coils onto an acrylic plate for constructing a haptic device, according to one implementation of the present disclosure.

FIG. 7 presents a system of mounting voice coils onto an acrylic plate for constructing a haptic device, according to one implementation of the present disclosure. FIG. 7 includes voice coils 780*a-f*, acrylic plate 781, acrylic covers 782*a-f*, and air holes 783*a-f*. With regards to FIG. 7, it should be noted that voice coils 780*a-f* correspond respectively to voice coils 180 from FIG. 1 and voice coils 380*a-f* from FIG. 3.

As illustrated in FIG. 7, each of voice coils 785*a-f* is mounted in acrylic plate 781 using an adhesive, such as glue (not shown). In a preferred implementation, the spacing between each of voice coils 780*a-d* is approximately 2.5 inches, the spacing between voice coil 780*e* and voice coil 780*f* is approximately 2.5 inches, the spacing between voice coil 780*b* and voice coil 780*e* is approximately 3 inches, and the spacing between voice coil 780*c* and voice coil 780*f* is approximately 3 inches.

Also illustrated in FIG. 7 is acrylic covers 782*a-f* and air holes 783*a-f*. Acrylic covers 782*a-f* are approximately 0.07 inch thick and have a diameter of approximately 0.865 inch. As illustrated in FIG. 7, each of acrylic covers 782*a-f* are situated respectively over each of voice coils 780*a-f*. Acrylic covers 782*a-f* may be attached to voice coils 780*a-f* using an adhesive, such as glue. Furthermore, each of acrylic covers 782*a-f* includes an air hole, such as air holes 783*a-f*, so that the air build up over voice coils 780*a-f* can be released. Air holes 783*a-f* each have a diameter of approximately 0.15 inch.

Figure 8:
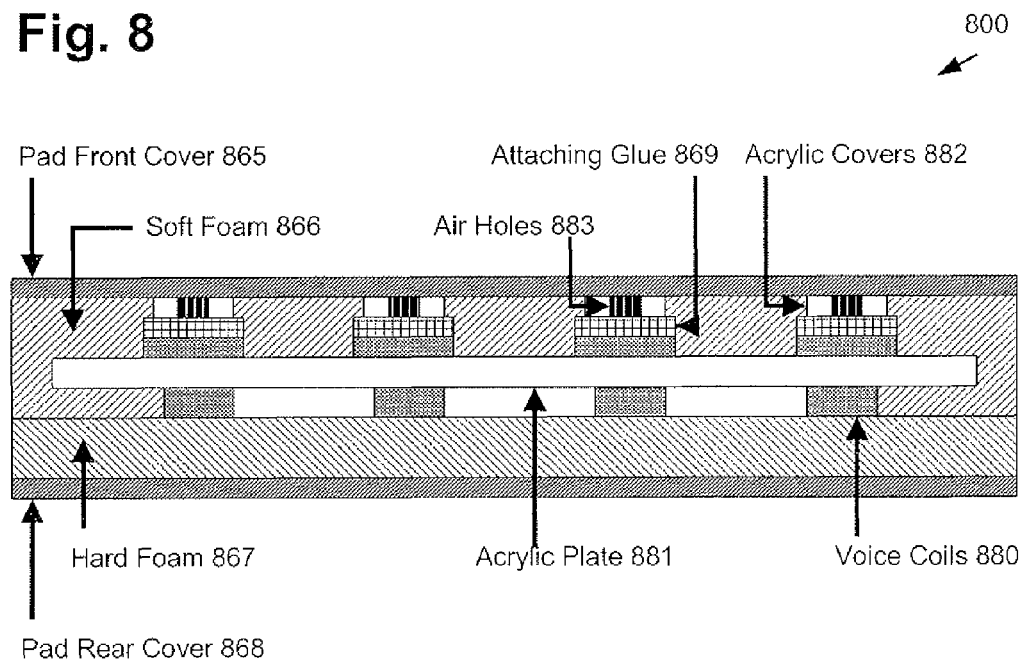
FIG. 8 presents a cross-section view of mounting voice coils in a pad by using an acrylic plate, according to one implementation of the present disclosure.

FIG. 8 presents a cross-section view of mounting voice coils in a pad by using an acrylic plate, according to one implementation of the present disclosure. With regards to FIG. 8, it should be noted that pad 800 corresponds to pad 500 from FIG. 5, except pad 800 now includes voice coils 880 inserted within pad 800. As such, pad front cover 865, soft foam 866, hard foam 867, and pad rear cover 868 of FIG. 8 correspond respectively to pad front cover 565, soft foam 566, hard foam 567, and pad rear cover 568 of FIG. 5. Furthermore, voice coils 880 correspond to voice coils 180 of FIG. 1, voice coils 380*a-f* of FIG. 3, and voice coils 780*a-f* of FIG. 7. Also, it should be noted that even though FIG. 8 only labels one of voice coils 880, acrylic covers 882, and air holes 883 for clarity, FIG. 8 illustrates four voice coils 880, four acrylic covers 882, and four air holes 883.

As illustrated in FIG. 8, a section of soft foam 866 has been removed from pad 800 so that acrylic plate 881, with attached voice coils 880, could be mounted within pad 800. Voice coils 880 are mounted so that a bottom of voice coils 880 are in contact with hard foam 867. This helps secure voice coils 880 and acrylic plate 881 in place. Furthermore, FIG. 8 illustrates how acrylic covers 882 are placed over voice coils 880 and attached using an adhesive, such as attaching glue 869. Air holes 883 are situated in the middle of each of acrylic covers 882 so that built up air can be released from voice coils 880.

Figure 9:
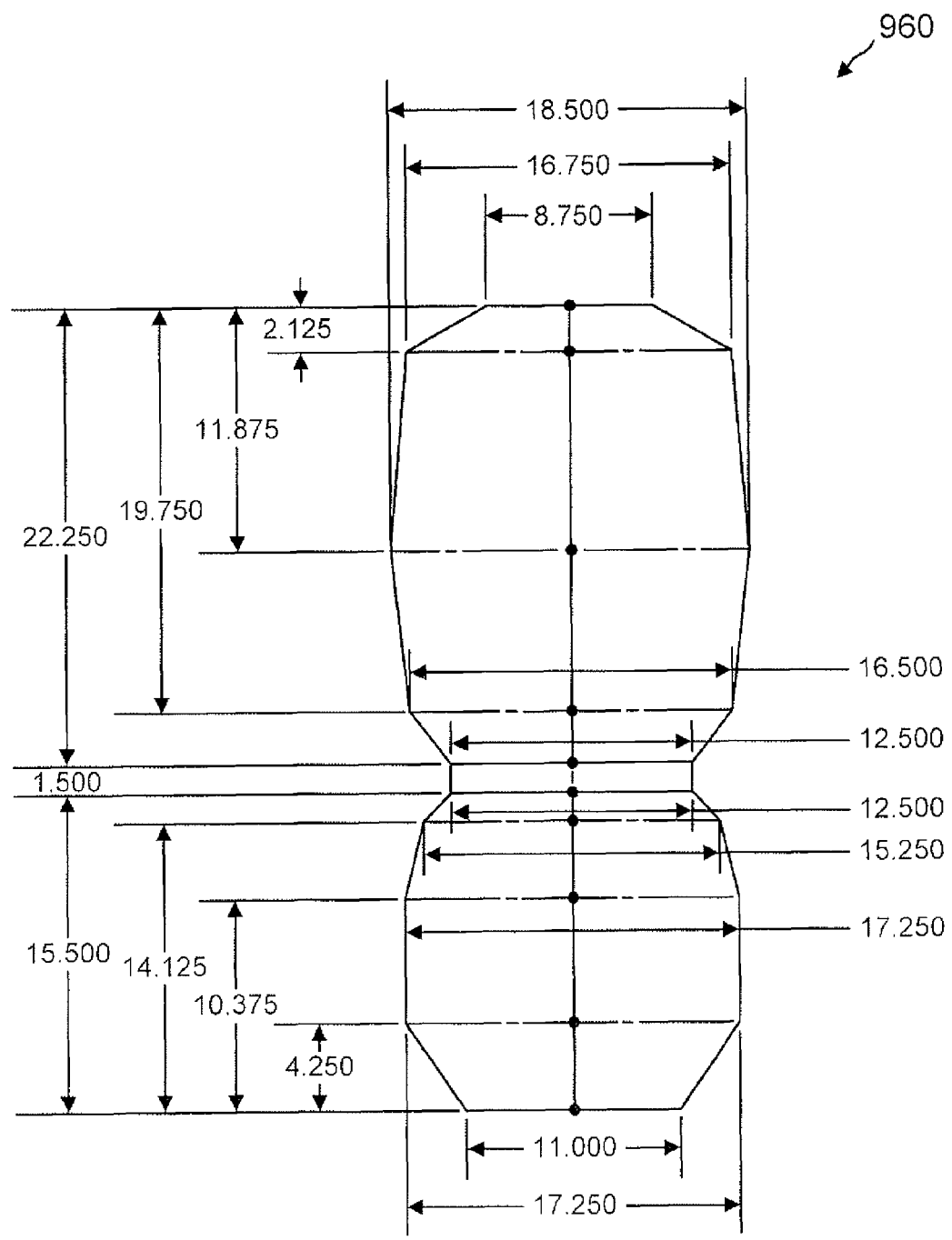
FIG. 9 presents an example for the general dimensions of a haptic chair, according to one implementation of the present disclosure.

FIG. 9 presents an example for the general dimensions of a haptic chair, according to one implementation of the present disclosure. FIG. 9 includes haptic device 960. With respect to FIG. 9, it should be noted that haptic device 960 corresponds to haptic device 160 of FIG. 1 and haptic device 360 of FIG. 3.

Figure 10:
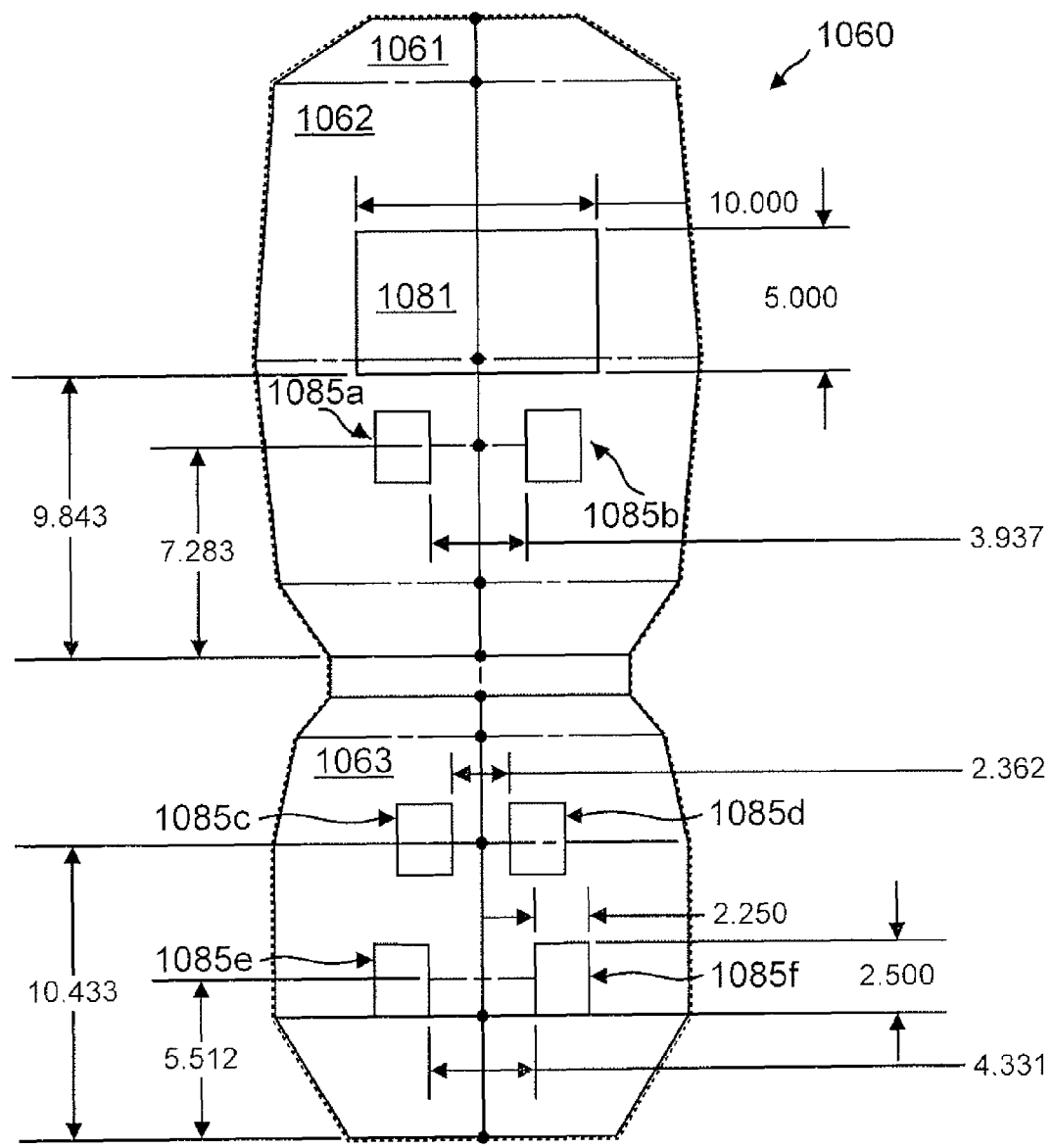
FIG. 10 presents an example of the general dimensions for placing actuators in a haptic chair, according to one implementation of the present disclosure.

FIG. 10 presents an example of the general dimensions for placing actuators in a haptic chair, according to one implementation of the present disclosure. FIG. 10 includes haptic device 1060. Haptic device 1060 includes head pad 1061, back pad 1062, and seat pad 1063, each of which is illustrated with clashed lines. Back pad 1062 includes acrylic plate 1081, vibrating motor 1085*a*, and vibrating motor 1085*b*.

Seat pad 1063 includes vibrating motors 1085c-f. With respect to FIG. 10, it should be noted that haptic device 1060, head pad 1061, back pad 1062, seat pad 1063, and vibrating motors 1085a-f correspond respectively to haptic device 160, head pad 161, back pad 162, seat pad 163, and vibrating motors 185a-f of FIG. 1, and haptic device 360, head pad 361, back pad 362, seat 363, and vibrating motors 385a-f of FIG. 3. It should further be noted that acrylic plate 1081 corresponds to acrylic plate 781 of FIG. 7 and acrylic plate 881 of FIG. 8.

Figure 11:
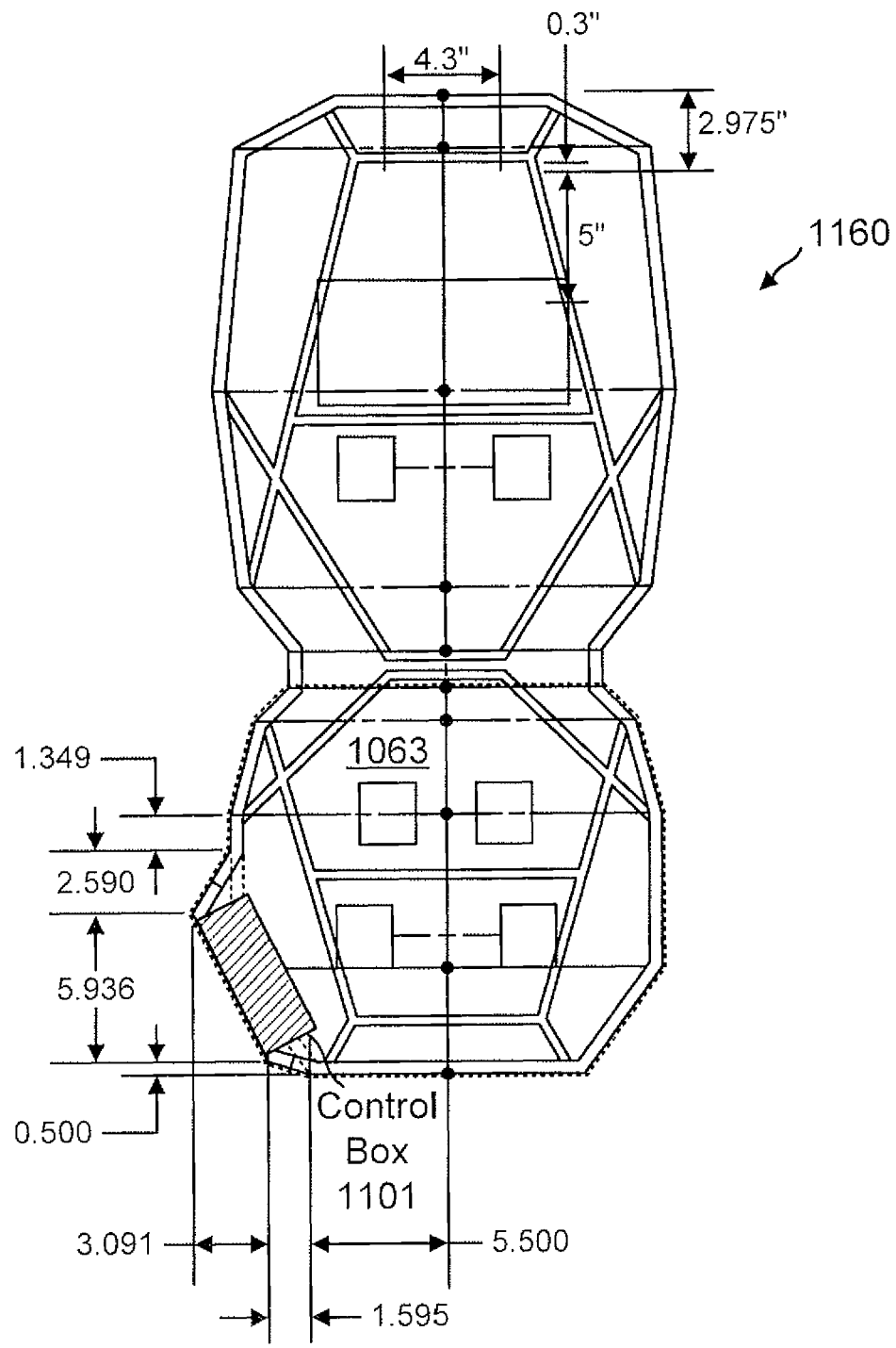
FIG. 11 presents an example of the general dimensions for placing a control box in a haptic chair, according to one implementation of the present disclosure.

FIG. 11 presents an example of the general dimensions for placing a control box in a haptic chair, according to one implementation of the present disclosure. FIG. 11 includes haptic device 1160. Haptic device 1160 includes seat pad 1163, which is represented using dashed lines. Seat pad 1163 includes control box 1101. With respect to FIG. 11, it should be noted that haptic device 1160 and seat pad 1163 correspond respectively to haptic device 160 and seat pad 163 of FIG. 1, haptic device 360 and seat pad 363 of FIG. 3, haptic device 960 and seat pad 963 of FIG. 9, and haptic device 1060 and seat pad 1163 of FIG. 10. It should further be noted that control box 1101 corresponds to control box 101 of FIG. 1 and control box 201 of FIG. 2.

As illustrated in FIG. 11, haptic device 1160 includes a haptic chair. Control box 1101 is mounted in the front right corner of seat pad 1163 so that a user of haptic device 1160 can easily access control box 1101. However, the implementation of FIG. 11 is not limiting. In other implementations, control box 1101 may be mounted anywhere within haptic device 1160. For example, control box 1101 may be mounted in the left side of seat pad 163 of haptic device 1160, or control box 1101 may be mounted in the back pad of haptic device 1160.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A device comprising:
a plurality of actuators configured to generate one or more sensations;
a memory storing a plurality predefined tactile patterns; and
a microphone for use to capture an audio; and
a processor configured to:
capture the audio using the microphone;
process the audio to generate an audio data stream;
execute an algorithm using the audio data stream to generate an activation pattern for a plurality of actuators, wherein the algorithm includes a direct mapping scheme and a special effects mapping scheme; and
activate the plurality of actuators according to the activation pattern to generate the one or more sensations;
wherein the direct mapping scheme utilizes a frequency level of the audio data stream to generate the activation pattern; and
wherein the special effects mapping scheme utilizes a triggering sound of the audio data stream to select a predefined tactile pattern from the plurality of predefined tactile patterns to generate the activation pattern, and wherein the activation pattern corresponds to the predefined tactile pattern.

2. The device of claim 1, wherein the plurality of actuators include voice coils and vibrating motors.

3. The device of claim 1, further comprising a slider switch, wherein the processor is further configured to:
receive a user input using the slider switch; and
modify a mode of the algorithm in response to the user input.

4. The device of claim 1, further comprising a control knob, wherein the processor is further configured to:
receive a user input using the control knob, and
modify an intensity of the plurality of actuators in response to the user input.

5. The device of claim 1 further comprising an USB port, wherein the processor is further configured to:
receive updates to the algorithm through the USB port.

6. The device of claim 1 further comprising a chair.

7. The device of claim 1, wherein the audio is received from at least one of a video game, a movie, a television show, and a music.

8. A method for providing tactile content on a device including a plurality of actuators, a microphone, a processor and a memory storing a plurality predefined tactile patterns, the method comprising:
capturing an audio using a microphone;
processing the audio to generate an audio data stream;
executing an algorithm using the audio data stream to generate an activation pattern for a plurality of actuators, wherein the algorithm includes a direct mapping scheme and a special effects mapping scheme; and
activating the plurality of actuators according to the activation pattern to generate one or more sensations;
wherein the direct mapping scheme utilizes a frequency level of the audio data stream to generate the activation pattern; and
wherein the special effects mapping scheme utilizes a triggering sound of the audio data stream to select a predefined tactile pattern from the plurality of predefined tactile patterns to generate the activation pattern, and wherein the activation pattern corresponds to the predefined tactile pattern.

9. The method of claim 8, wherein the plurality of actuators include voice coils and vibrating motors.

10. The method of claim 8, further comprising:
receiving a user input using a slider switch; and
modifying a mode of the algorithm in response to the user input.

11. The method of claim 8, further comprising:
receiving a user input using a control knob, and
modifying an intensity of the plurality of actuators in response to the user input.

12. The method of claim 8, further comprising:
receiving updates to the algorithm through a USB port.

13. The method of claim 8, further comprising a chair.

14. The method of claim 8, wherein the audio is received from at least one of a video game, a movie, a television show, and a music.

* * * * *